Patented Dec. 24, 1940

2,226,156

UNITED STATES PATENT OFFICE 2,226,156

CARBOCYANINE DYE

Leslie G. S. Brooker and Robert H. Sprague, Rochester, N. Y., assignors to Eastman Kodak Company, Rochester, N. Y., a corporation of New Jersey No Drawing. Application February 21, 1940, Serial No. 320,164. In Great Britain March 30, 1939

12 Claims. (Cl. 260—240)

This invention relates to carbocyanine dyes of a new kind and to a process for preparing the same.

It is known that carbocyanine dyes can be prepared by condensing anhydrides of unsaturated acids, such as crotonic acid, with cyclammonium quaternary salts containing an alkylmercapto group in the α- or γ-position. It is further known that carbocyanine dyes can be prepared by condensing dibasic acids, such as glutaconic acid, with cyclammonium quaternary salts containing an alkylmercapto group in the α- or γ-position.

We have now found that anhydrides of certain dibasic carboxylic acids can be condensed with cyclammonium quaternary salts containing a methyl group in the α-position, to give carbocyanine dyes quite different from the carbocyanine dyes obtainable by the prior methods. Our new carbocyanine dyes are characterized by having an organic group on the trimethine chain attached to which is a carboxyl group. This carboxyl group can be esterified with alcohols to give the corresponding esters. Some of our new dyes sensitize photographic silver halide emulsions. Our new dyes can be employed to dye textiles, and as the light absorbing means in the manufacture of light filters.

It is, accordingly, an object of our invention to provide new carbocyanine dyes. A further object is to provide a process for preparing carbocyanine dyes. Other objects will become apparent hereinafter.

In accordance with our invention, we condense a phthalic anhydride (i. e., an anhydride of a benzene-1,2-dicarboxylic acid) or succinic anhydride with a cyclammonium quaternary salt containing a methyl group in the α-position, in the presence of a basic condensing agent. 2-methylbenzothiazole, 2-methylbenzoselenazole, 2-methylbenzoxazole, 2-methylthiazoline, μ-methylnaphthothiazole and μ-methylnaphthoxazole quanternary salts condense readily with these anhydrides. As basic condensing agents, we have found that pyridine and pyridine containing a strong organic base are advantageously employed. By "strong organic base," we mean an organic base having a dissociation constant substantially greater than that of pyridine. Typical strong organic bases are, of course, triethylamine, piperidine and triethanolamine. Heat accelerates the formation of our new dyes. The carboxylated dyes obtained in the foregoing manner can be esterified with alcohols in the presence of acid esterification catalysts, such as hydrogen chloride.

Our dyes can be represented by the following general formula:

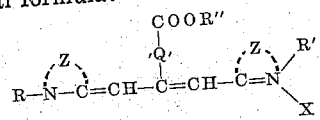

wherein R and R' each represent an alkyl group, such as methyl, ethyl, isoamyl, benzyl or β-ethoxyethyl for example, R'' represents a member selected from the group consisting of hydrogen and alcohol radicals, i. e., alkyl groups, Q represents a member selected from the group consisting of o-phenylene and ethylene groups, X represents an acid radical such as p-toluenesulfonate, iodide, chloride, bromide, or perchlorate for example, and Z represents the non-metallic atoms necessary to complete a heterocyclic organic nucleus, such as a benzothiazole nucleus (e. g., 5-chlorobenzothiazole), a benzoselenazole nucleus, a naphthoxazole nucleus, a naphthothiazole nucleus or a thiazoline nucleus for example.

The following examples will serve to demonstrate the manner of obtaining our new dyes. These examples, however, are not intended to limit our invention:

EXAMPLE 1.— 3,3'-diethyl-9-(o-carboxyphenyl)-4,5,4',5'-dibenzothiacarbocyanine-p-toluenesulfonate

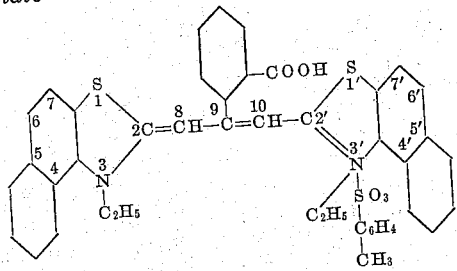

2.0 g. (2 mol.) of 2-methyl-β-naphthothiazole etho-p-toluenesulfonate and 3.0 g. (1 mol.+700% excess) of phthalic anhydride were mixed together in 15 cc. of pyridine. The resulting mixture was boiled, under reflux, for ten minutes. Green crystals of the dye separated slowly from the boiling mixture. The mixture was chilled to 0° C., the dye filtered off, washed on the filter with acetone and water and finally dried in the air. 0.35 g. (18% yield) of dye were obtained.

It was recrystallized from methyl alcohol (100 cc. per gram of dye) and obtained as green crystals, melting at 216° to 218° C., with decomposition. 0.3 g. (16% yield) of the pure dye was obtained. A methyl alcoholic solution of the dye showed an absorption maximum at 595 mu. The dye sensitized a photographic gelatino-silver-bromiodide emulsion strongly up to 720 mu. with a maximum at 660 mu.

Treating 2-methyl-β-naphthothiazole metho-p-toluenesulfonate in the same manner, a considerable quantity of a crystalline yellow product, melting at 280° to 282° C., with decomposition, was obtained. This yellow product was identified as 2-(1-methyl-2(1)-β-naphthothiazolylidene)-1,3-indanedione, which has the following formula:

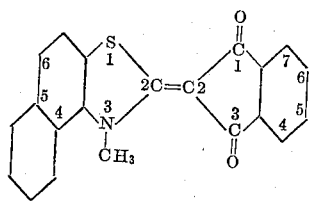

EXAMPLE 2.—3,3'-diethyl-9-(o-carboxyphenyl)-thiacarbocyanine iodide 1.5 g. (2 mol.) of 2-methylbenzothiazole ethiodide and 3.0 g. (1 mol.+700% excess) of phthalic anhydride were mixed together in 15 cc. of pyridine. The mixture was boiled, under reflux, for ten minutes. The resulting purple solution was cooled and diluted with 100 cc. of diethyl ether. The diluted solution was chilled to 0° C., while stirring. The dye which separated was filtered off, washed on the filter with acetone and water, and finally dried in the air. 1 g. (65% yield) of blue crystals were thus obtained. The dye was recrystallized from methyl alcohol (88 cc. per gram of dye) and obtained, in 52% yield, as minute green crystals, melting, with decomposition, at 204 to 205° C. A methyl alcoholic solution of the dye showed an absorption maximum at 560 mu. The dye sensitized a gelatino-silver-bromiodide emulsion fairly strongly out to 635 mu. with a maximum at 580 mu.

EXAMPLE 3.—3,3'-diethyl-7-(o-carboxyphenyl)-thiazolinocarbocyanine iodide

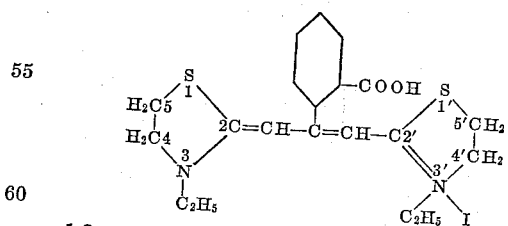

1.3 g. (2 mol.) of 2-methylthiazoline ethiodide and 3.0 g. (1 mol.+700% excess) of phthalic anhydride were mixed together in 15 cc. of pyridine. The mixture was boiled, under reflux, for ten minutes. The resulting orange-colored solution was cooled, diluted with 100 cc. of diethyl ether and chilled to 0° C. The dye which separated was filtered off, washed on the filter with acetone and water and dried in the air. 0.35 g. (27% yield) of orange dye was obtained. The dye was recrystallized from methyl alcohol (13 cc. per gram of dye) and obtained, in 23% yield, as red crystals having a metallic reflex and melting, with decomposition, at 250° to 252° C. A methyl alcoholic solution of the dye showed an absorption maximum at about 460 mu. The dye had practically no sensitizing action on photographic silver halide emulsions.

EXAMPLE 4.—3,3'-diethyl-9-(o-carboxyphenyl)-selenacarbocyanine iodide 1.76 g. (2 mol.) of 2-methylbenzoselenazole ethiodide and 3.0 g. (1 mol.+700% excess) of phthalic anhydride were mixed together in 15 cc. of pyridine. The mixture was boiled, under reflux, for ten minutes. The resulting purple solution was cooled, diluted with 100 cc. of diethyl ether and chilled to 0° C. The dye which separated was filtered off, washed with acetone and water and finally dried in the air. 0.5 g. (28% yield) of green crystals were thus obtained. The dye was recrystallized from methyl alcohol (100 cc. per gram of dye) and obtained, in 23% yield, as green crystals, having a green reflex and melting at 214° to 215° C. with decomposition. A methyl alcoholic solution of the dye showed an absorption maximum at 575 mu. The dye sensitized a gelatino-silver-bromiodide emulsion moderately out to 645 mu. with a maximum at 600 mu.

EXAMPLE 5.—3,3'-dimethyl-9-(o-carboxyphenyl)-oxacarbocyanine iodide 2.75 g. (2 mol.) of 2-methylbenzoxazole methiodide and 6.0 g. (1 mol.+700% excess) of phthalic anhydride were mixed together in 15 cc. of pyridine. The mixture was boiled, under reflux, for ten minutes. The resulting red solution was cooled, diluted with 100 cc. of diethyl ether and chilled to 0° C. The dye which separated was filtered off, washed with acetone and water, and finally dried. 1.5 g. (54% yield) of orange crystals were thus obtained. The crude product contained considerable unchanged starting material, since on recrystallization from methyl alcohol (30 cc.), only 0.3 g. (11% yield) of violet crystals, melting at 234° to 236° C., with decomposition, were obtained. A methyl alcoholic solution of the dye showed an absorption maximum at about 490 mu. The dye sensitized a gelatino-silver-bromiodide emulsion out to about 560 mu. with a maximum at 530 mu.

EXAMPLE 6.—5,5'-dichloro-3,3'-diethyl-9-(o-carboxyphenyl)-thiacarbocyanine iodide 3.8 g. (2 mol.) of 2-methyl-5-chlorobenzothiazole etho-p-toluenesulfonate and 6.0 g. (1 mol.+700% excess) of phthalic anhydride were mixed together in 15 cc. of pyridine. The mixture was boiled, under reflux, for ten minutes. The resulting purple solution was cooled, diluted with 100 cc. of diethyl ether, the diluted mixture chilled to 0° C., while stirring, and finally the ether layer decanted off. The residue was dissolved in 10 cc. of methyl alcohol. To the methyl alcoholic solution, an excess of sodium iodide dissolved in methyl alcohol was added. The resulting mixture was chilled to 0° C., the dye filtered off, washed with acetone and water and finally dried in the air. 1.65 g. (49% yield) of green crystals were thus obtained. After recrystallization from methyl alcohol (105 cc. per gram of dye), the dye was obtained, in 35% yield, as minute green crystals having a golden reflex and melting, with decomposition, at 205° to 207° an absorption maximum at about 565 mu. The dye sensitized a gelatino-silver-bromiodide fairly strongly out to 645 mu., with a maximum at about 590 mu.

EXAMPLE 7.—9-(β-carboxyethyl)-3,3'-diethyl-thiacarbocyanine perchlorate

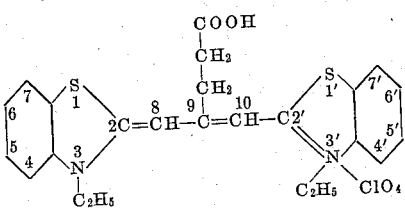

6.1 g. (2 mol.) of 2-methylbenzothiazole ethiodide and 8.0 g. (1 mol.+700% excess) of succinic anhydride were mixed together in 30 cc. of pyridine. The mixture was boiled, under reflux, for fifteen minutes. The resulting purple solution was cooled and diluted with diethyl ether to precipitate the dye. The precipitated dye was discipitate the dye. The precipitated dye was dissolved in 50 cc. of methyl alcohol. The methyl alcoholic solution was treated with an excess of sodium perchlorate dissolved in methyl alcohol to precipitate the dye as the perchlorate. 0.7 g. (13% yield) of green crystals were thus obtained. The dye was recrystallized from methyl alcohol (50 cc. per gram of dye) and obtained, in 11% yield, as minute green crystals melting with decomposition at 211° to 213° C. A methyl alcoholic solution of the dye showed an absorption maximum at 550 mu. The dye sensitized a gelatino-silver-bromiodide emulsion out to 640 mu., with maxima at 600 mu. and 540 mu.

EXAMPLE 8.—3,3'-diethyl-9-(o-carbethoxyphenyl)-4,5,4',5'-dibenzothiacarbocyanine bromide

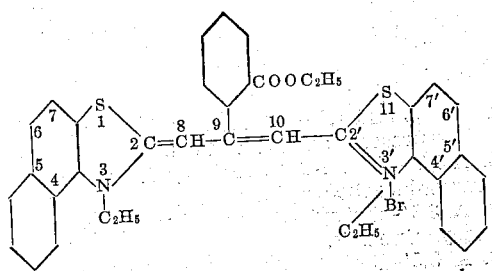

2.0 g. (1 mol.) of 3,3'-diethyl-9-(o-carboxyphenyl)-4,5,4',5'-dibenzothiacarbocyanine-p-toluenesulfonate were dissolved in 300 cc. of absolute ethyl alcohol and a stream of dry hydrogen chloride was passed in the solution for three hours. The solution was then concentrated to a volume of 200 cc. An excess of potassium bromide was then added to the solution, the solution diluted with 100 cc. of diethyl ether and chilled to 0° C. The dye which separated was filtered off, washed with acetone and water and finally dried in the air. 1.4 g. (77% yield) of green crystals were thus obtained. These were recrystallized from methyl alcohol (66 cc. per gram of dye) and obtained, in 50% yield, as bright green crystals melting with decomposition at 245° to 247° C. A methyl alcoholic solution of the dye showed an absorption maximum at 598 mu. The dye sensitized a gelatino-silver-bromide emulsion less strongly than the corresponding carboxy dye (see Example 1) out to 705 mu., with a maximum at 675 mu.

EXAMPLE 9.—9-(o-carbmethoxyphenyl)-3,3'-diethyl-4,5,4',5'-dibenzothiacarbocyanine bromide 2.0 g. (1 mol.) of 3,3'-diethyl-9-(o-carboxyphenyl)-4,5,4',5'-dibenzothiacarbocyanine bromide were dissolved in 150 cc. of absolute methyl alcohol. The solution was boiled, under reflux, while dry hydrogen chloride was passed into the solution for three hours. At the end of this time, an excess of potassium bromide was added to the hot solution and the resulting mixture was chilled to 0° C. The dye which separated was filtered off, washed with water and acetone and finally dried. 1.3 g. (72% yield) of the dye was thus obtained. It was recrystallized from methyl alcohol (165 cc. per gram of dye) and obtained as minute green crystals having a metallic reflex and melting with decomposition at 236° to 238° C. It sensitized a gelatino-silver-bromiodide emulsion out to 705 mu., with a broad maximum extending from 640 mu. to 680 mu.

We have also found that 3-alkyl-1-aryl-5-pyrazolones can be condensed with phthalic anhydride to give simple oxonol dyes. The following example will serve to illustrate the preparation of such a dye:

EXAMPLE 10.—Bis-3-methyl-1-phenyl-5-pyrazolone-(4)-(o-carboxyphenyl)-methinoxonol

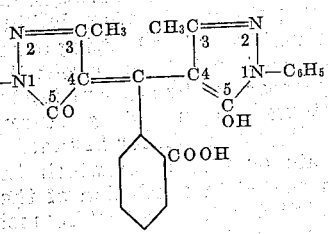

1.75 g. (2 mols.) of 3-methyl-1-phenyl-5-pyrazolone and 6 g. (1 mol.+700% excess) of phthalic anhydride were mixed together in 15 cc. of pyridine. The mixture was boiled, under reflux, for ten minutes. The orange-red solution was diluted to 1200 cc. with water, a small amount of colorless solid filtered off and the filtrate made acid with acetic acid. The orange precipitate was filtered off, washed with water and dried in the air. Yield of crude orange dye was 1.5 g., 63%. After recrystallization from methyl alcohol, (45 cc./g.), the product was obtained as red crystals melting with decomposition at 217° to 218° C. Yield .7 g., 29%. Absorption maximum at 4940 Å. in methyl alcohol. The dye had no sensitizing action.

As shown in the above examples, an excess of the anhydride is advantageously employed. Excesses of from 100 to 700% are advantageously employed.

In the preparation of photographic emulsions containing our new dyes, it is only necessary to disperse the dyes throughout the emulsions. The methods of incorporating the dyes in emulsions are simple and well known to those skilled in the art. It is convenient to add the dyes from solutions in appropriate solvents. Methanol has proven satisfactory as a solvent for our new dyes. Ethyl alcohol or acetone may also be employed. Ordinarily, it is advantageous to incorporate our new dyes in the finished, washed emulsions. The dyes should, of course, be uniformly distributed throughout the emulsions.

The concentration of our new dyes in the emulsion can vary widely, i. e. from about 5 to about 100 mg. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion, sensitized with our new dyes, the following procedure is satisfactory: A quantity of the dye desired is dissolved in methyl alcohol or other suitable solvent and a volume of this solution (which may be diluted with water) containing from 5 to 100 mg. of the dye is slowly added to about 1000 cc. of a developing-out gelatino-silver-halide emulsion with stirring. Stirring is continued until the dye is uniformly distributed throughout the emulsion. With most of our new dyes, 10 to 20 mg. of dye per liter of emulsion suffices to produce the maximum sensitizing effect with the ordinary gelatino-silver-bromide (including bromiodide) emulsions. With fine-grain emulsions, which includes most of the ordinarily employed gelatino-silver-chloride emulsions, somewhat larger concentrations of dye may be necessary to secure the optimum sensitizing effect.

The above statements are only illustrative and not to be understood as limiting our invention in any sense, as it will be apparent that our dyes can be incorporated by other methods in many of the photographic emulsions customarily employed in the art, such, for instance, as by bathing a plate or film upon which the emulsion has been coated in a solution of the dye in an appropriate solvent. The bathing methods, however, are not to be preferred ordinarily.

What we claim as our invention and desire to be secured by Letters Patent of the United States is:

1. A carbocyanine dye characterized by the following general formula:

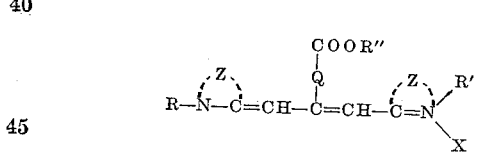

wherein R and R' each represent an alkyl group, R'' represents a member selected from the group consisting of hydrogen and alkyl groups, Q represents a member selected from the group consisting of o-phenylene and ethylene groups, X represents an acid radical and Z represents the non-metallic atoms necessary to complete a heterocyclic organic nucleus.

2. A carbocyanine dye characterized by the following general formula:

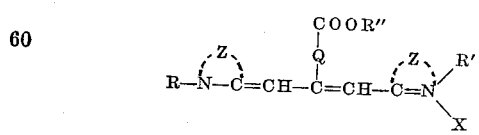

wherein R and R' each represent an alkyl group, R'' represents a member selected from the group consisting of hydrogen and alkyl groups, Q represents a member selected from the group consisting of o-phenylene and ethylene groups, X represents an acid radical and Z represents the non-metallic atoms necessary to complete a heterocyclic organic nucleus selected from the group consisting of benzothiazole, benzoxazole, benzoselenazole, naphthothiazole, naphthoxazole and thiazoline nuclei.

3. A carbocyanine dye characterized by the following general formula:

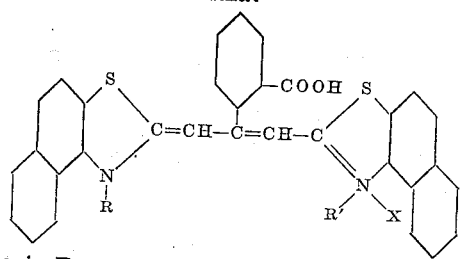

wherein R and R' each represent an alkyl group and X represents an acid radical.

4. A carbocyanine dye characterized by the following general formula:

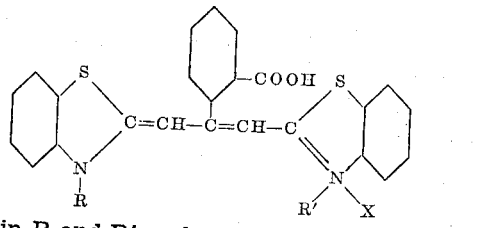

wherein R and R' each represent an alkyl group and X represents an acid radical.

5. A carbocyanine dye characterized by the following general formula:

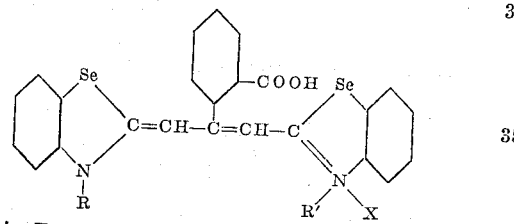

wherein R and R' each represent an alkyl group and X represents an acid radical.

6. A 3,3'-diethyl-9-(o-carboxyphenyl)-4,5,4',5'-dibenzothiacarbocyanine salt.

7. A 3,3'-diethyl-9-(o-carboxyphenyl)-thiacarbocyanine salt.

8. A 3,3'-diethyl-9-(o-carboxyphenyl)-selenacarbocyanine salt.

9. A process for preparing a carbocyanine dye comprising condensing, in the presence of a basic condensing agent, an organic acid anhydride selected from the group consisting of phthalic anhydrides and succinic anhydrides, with a cyclammonium quaternary salt containing a methyl group in the α-position.

10. A process for preparing a carbocyanine dye comprising condensing, in the presence of pyridine, an organic acid anhydride selected from the group consisting of phthalic anhydrides and succinic anhydrides, with a cyclammonium quaternary salt containing a methyl group in the α-position.

11. A process for preparing a carbocyanine dye comprising condensing, in the presence of pyridine, phthalic anhydride with a cyclammonium quaternary salt containing a reactive methyl group in the α-position.

12. A process for preparing a carbocyanine dye comprising condensing, in the presence of pyridine, phthalic anhydride with a cyclammonium quaternary salt selected from the group consisting of 2-methylbenzothiazole, 2-methylbenzoxazole, 2-methylbenzo-selenazole, μ-methylnaphthothiazole, μ-methylnaphthoxazole and 2-methylthiazoline quaternary salts.

LESLIE G. S. BROOKER.
ROBERT H. SPRAGUE.

CERTIFICATE OF CORRECTION.

Patent No. 2,226,156. December 24, 1940.

LESLIE G. S. BROOKER, ET AL.

It is hereby certified that error appears in the printed specification of the above numbered patent requiring correction as follows: Page 2, second column, line 71, for "207°" read --207° C. A methyl alcoholic solution of the dye showed--; and that the said Letters Patent should be read with this correction therein that the same may conform to the record of the case in the Patent Office.

Signed and sealed this 25th day of February, A. D. 1941.

(Seal)

Henry Van Arsdale,
Acting Commissioner of Patents.